(No Model.)
K. WITTE.
SHEARS.
No. 299,310. Patented May 27, 1884.
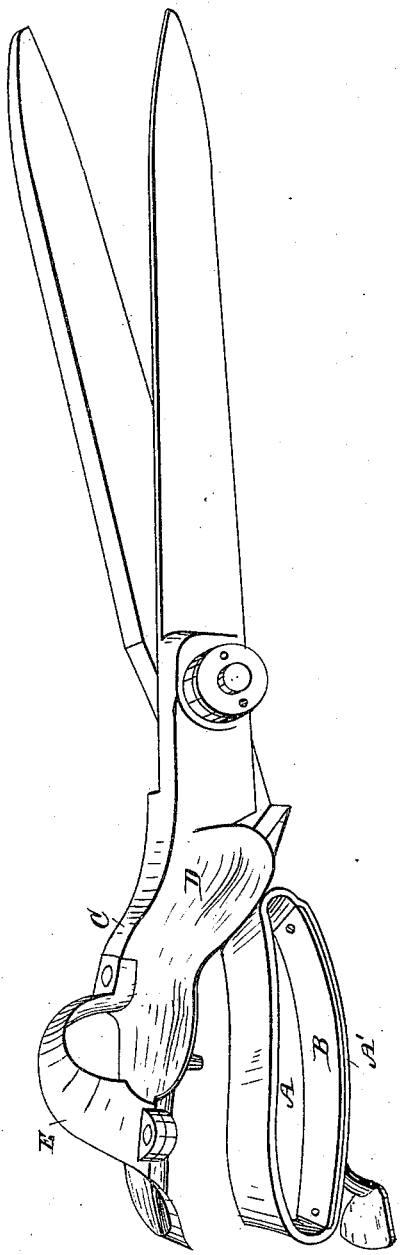
WITNESSES:
Theo. G. Hoster
C. Sedgwick
INVENTOR:
K. Witte
BY Munn & Co
ATTORNEYS.

UNITED STATES PATENT OFFICE.

KARL WITTE, OF HARTFORD, CONNECTICUT.

SHEARS.

SPECIFICATION forming part of Letters Patent No. 299,310, dated May 27, 1884.

Application filed October 24, 1883. (No model.)

*To all whom it may concern:*

Be it known that I, KARL WITTE, of Hartford, in the county of Hartford and State of Connecticut, have invented a new and useful Improvement in Hand-Shears, of which the following is a full, clear, and exact description.

The object of my invention is to provide certain new and useful improvements in hand-shears whereby a firmer grip can be obtained on the handles of the shears and the fingers will not be chafed or hardened by the surfaces of the handles.

This invention, which is an improvement on the hand-shears for which United States Letters Patent No. 85,500 were issued to me on the 29th day of December, 1868, consists in providing the handle-loop for receiving the fingers with a lining of soft rubber or analogous material, and providing the handle for the thumb with a hard or soft rubber bow, under which the thumb is to be passed, as will be hereinafter described, and specifically set forth in the claims.

Reference is to be had to the accompanying drawing, forming part of this specification, in which a perspective view of a pair of hand-shears provided with my improvements is shown.

The elongated handle-loop A on one shear-blade is constructed in the usual manner. On that side piece A' of the loop A against which the outer sides of the fingers rest a piece of rubber, B, or a lining of soft rubber or analogous material, is secured to the inner surface, so that the outer sides of the fingers will not rest against the metal forming the loop, but against the rubber or other lining B. The handle C of the other blade is provided with a curved flare, D, on which the inner surface of the thumb is to rest, and to the lower part of the said handle C a bow, E, is fastened by screws or otherwise, which bow is so shaped as to fit well against the outer surface of the lower part of the thumb. The said bow E is to be made of soft or hard rubber, or some analogous material which will not chafe or harden the skin on the outer surface of the lower part of the thumb, and which produces less friction and is more agreeable for the operator than metal bows.

I am aware that it is not new to provide a pair of scissors with a pivoted metallic thumb-loop having a flexible lining, and I do not desire to claim such as my invention.

Having thus fully described my invention, I claim as new and desire to secure by Letters Patent—

1. As a new article of manufacture, a pair of scissors or shears the upper handle of which is provided with a flaring thumb-loop, the lower half of which is formed integral with its blade, and the upper half of which is formed of india-rubber and riveted to the lower portion, and the lower handle formed with the usual hand-loop having a rubber lining in the lower portion thereof, whereby the back of the thumb and fingers will be afforded a contact-surface not liable to chafe or harden the skin, substantially as set forth.

2. Hand-shears having a lining of soft rubber or analogous material on one handle-loop and having a hard rubber bow secured to the other handle, substantially as herein shown and described.

KARL WITTE.

Witnesses:
FRANCIS H. PARKER,
LEWIS SPERRY.